CONTINUOUS REDOX PROCESS FOR DISSOLVING COPPER

Filed March 19, 1971

INVENTOR.
EDWIN B. KING
BY
Christie, Parker & Hale
ATTORNEYS

United States Patent Office 3,705,061

Patented Dec. 5, 1972

3,705,061
CONTINUOUS REDOX PROCESS FOR DISSOLVING COPPER

Edwin B. King, Hitchcock, Tex., assignor to Southern California Chemical Co., Inc., Santa Fe Springs, Calif.

Filed Mar. 19, 1971, Ser. No. 126,141
Int. Cl. C23g 1/36, 3/00
U.S. Cl. 156—19 8 Claims

ABSTRACT OF THE DISCLOSURE

There is provided a continuous regenerative redox system for dissolving copper from substrates. An alkaline etch solution containing cupric ions as the oxidizer is used to oxidize and thereby dissolve copper with attendant reduction of the cupric ions to the cuprous state. A portion of the etch solution is continuously removed from the system. A source of oxygen and an ammonia based replenishing solution are added to reconstitute the alkaline etch solution. The replenishing solution requirements of the system are determined by continuously monitoring the specific gravity of the etch solution and pH with respect to ammonium content.

BACKGROUND OF THE INVENTION

The present invention relates to a continuous process for dissolving copper by an oxidation-reduction reaction.

Copper has been dissolved from ores, alloys and like substrates for many years by the use of redox solutions in which some component in the solution is reduced as the copper present in the substrate is oxidized to the cuprous state.

Although somewhat more complex, identical principles are employed in the etching of copper in the manufacture of printed circuits. A usual procedure involves placing a resist pattern over a sheet of copper laminated to one or both sides of a plastic core. The masked copper-laminate is then brought into contact with an etching solution which dissolves the exposed copper and leaves behind the copper which is protected by the resist pattern.

In an alternative technique, a reverse pattern may be placed on the copper. Then the uncoated, or unprotected surface is electroplated with a corrosion-resisting material such as lead-tin alloys, bright tin, nickel, silver, gold and the like. Following this negative image plating, the reverse image is removed with a suitable solvent and the etching process is carried out in the manner described for positive images, namely, the exposed copper is dissolved and the copper protected by the metal plate is preserved.

Several acidic copper etch or dissolving solutions for employment in replenishment or regenerative systems have been proposed.

One acidic system employs copper chloride as the oxidant for copper. Cupric ion is reduced during oxidation of metallic copper and subsequently regenerated by contact with chlorine gas or by electrolytic oxidation.

Another acidic system employs ferric chloride as the starting oxidizer. With use, however, this system inherently converts with time to the acidic cupric chloride system described above.

Another acidic system employs use of ammonium persulfate. In operation, copper ammonium sulfate is crystallized out and residual unreacted ammonium persulfate returned to the etching operation together with sufficient ammonium persulfate to restore the activity of the etching solution.

The acidic etch systems generally described above suffer several disadvantages particularly in connection with the etching of printed circuits. A major disadvantage is galvanic corrosion which occurs at junctions of dissimilar metals when metallic alloy or a bimetallic resist pattern is used. Another disadvantage is excessive undercutting which results in an excessive number of rejects in circuit board etching operations.

SUMMARY OF THE INVENTION

According to the present invention, there is provided a continuous process for dissolving copper from copper bearing substrate at various uniform rates. A copper bearing substrate is brought in contact with a neutral or alkaline etch solution containing complexed cupric ions in a dissolving zone where copper is oxidized to the cuprous state simultaneously with the reduction of cupric ions. The resultant solution has an increased copper content as a consequence of dissolved cuprous ions. A portion of the ionic copper bearing solution is withdrawn and the ionic copper content of the balance determined by a specific gravity measurement. From this analysis, an amount of a neutral or alkaline ammonia based replenishing solution is added to maintain copper concentration within a prescribed range. An oxidizing agent, typically air, is also introduced to oxidize cuprous ions back to the cupric state. The reconstituted solution is employed to etch or dissolve additional copper.

In the preferred operation, the sump of a spray etcher serves as a reservoir for fresh etch and partially spent solutions which are comingled. The amount of solution withdrawn is determined by a fixed level overflow. A bleed from the reservoir is passed to a gravometric analyzer which, in turn, controls the amount of an ammonia based replenishing solution provided to the sump.

The specific gravity of the alkaline etch solution is maintained above about 1.07, preferably from about 1.14 and about 1.27 which corresponds to an ionic copper concentration of about 50 grams per liter preferably from about 100 to 200 grams per liter, the ionic copper being in the cuprous and/or cupyric state.

Introduction of the alkaline replenishing solution to maintain the solution at a pH above about 7.5, preferably from about 7.5 to about 10.5, makes it capable of etching an ounce of copper from a layer having a thickness of 1.4 mils in less than a minute under conventional operating conditions.

In an alternative embodiment, that portion of the reservoir solution which is not removed from the system is continuously treated externally to the etcher with the replenishing solution and oxidizer and brought in contact with the copper bearing substrate to be etched prior to return to the etcher reservoir. Again, the replenisher requirements for the etch solution are determined as a consequence of measuring the ionic copper concentration of the spent etch solution.

By the practice of this invention the only solutions which need to be introduced into the system are the neutral or alkaline ammonia based replenisher and an oxidizing agent for the cuprous ion.

The alkaline etchant systems used in accordance with the practice of this invention are less severe in action than prior acidic systems in that the difficulties attendant to them are not encountered. In addition, the reagents used are less hazardous and, where desired, the use of chlorine in etchant regeneration can be avoided.

Although a sodium based solution may initially be used as a startup solution, sodium concentration is continuously diluted by virtue of withdrawal of part of the solution and eventually the etch system becomes free of sodium ions providing a takeoff solution of high economic value.

DRAWINGS

DESCRIPTION

Figure 1:
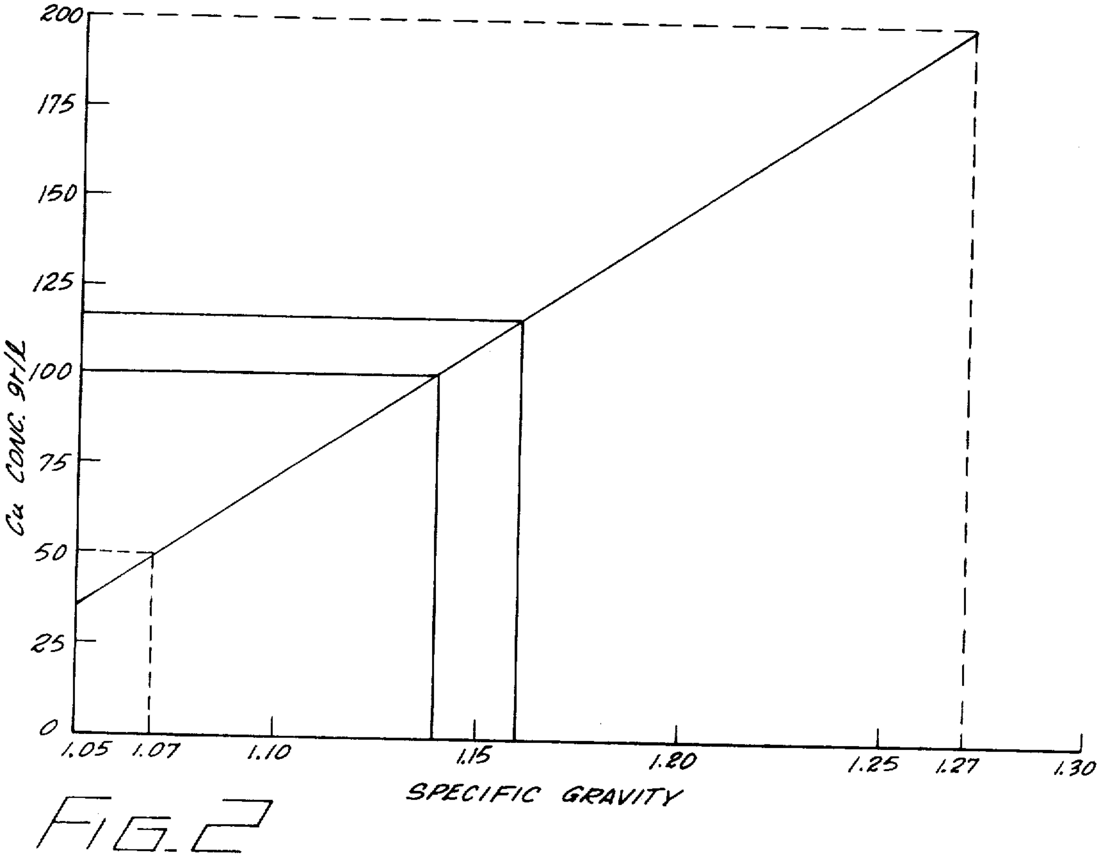
FIG. 1 is an illustration of the copper content of an alkaline etch solution as a function of specific gravity.

According to the present invention there is provided a continuous process for etching or dissolving copper from a copper bearing substrate such as bronze screens, machined pieces, alloys and copper plated surfaces which process is particularly useful for continuously etching circuit boards at a uniform high rate of etch.

The process of this invention, in general, comprises contacting copper bearing substrate such as, for example, a suitably masked copper plated precursor of a circuit board, with an alkaline etch solution containing a controlled amount of complexed cupric ions to oxidize the exposed copper to the cuprous state with contemporaneous reduction of the cupric ion to the cuprous state. A portion of the solution employed is withdrawn and the ionic copper content of the balance determined. There is then introduced to the system a neutral to alkaline ammonia based regenerative solution in an amount sufficient to dilute ionic copper concentration to the desired level and an oxidizing agent, such as oxygen, either through normal ventilation of a spray etcher or separately to convert at least part of the cuprous ions present to the cupric state. This reconstitutes the alkaline etch solution.

In this system, cupric ions serve as the oxidizer for copper. Since the solution is constantly regenerated, the copper bearing substrate is continuously brought into contact with an oxidizing solution of controlled high etch activity. Accordingly, uniform and high rate of etch may be obtained.

The oxidizing or etch solution used in the practice of this invention is alkaline in nature and contains as the oxidizing complex cupric ions in the form of a complex salt having the general formula $$Cu^{++}(Y)_x(Z^-)_2$$

wherein Y is the complexing agent; Z is the anion of the complex salt and $x$ represents the number of mols of complexing agent which complexes with the cupric ion. The complexing agent employed may be either the ammonia radical or a mixture of the ammonium ion and one or more chelating agents which will provide a bivalent cupric complex in the alkaline media.

Illustrative but no wise limiting of the chelating agents for complexing cupric ion in conjunction with ammonia, there may be mentioned ethylene diamine, tetraacetic acid, ethylenediamine, diethylenetriamine, triethylenetetraamine, $\beta$, $\beta'$, $\beta''$ triaminotriethylamine and the like. The preferred chelating agents are those which have tetra or hexadent properties and ethylene diamine tetraacetic acid is particularly preferred.

As indicated, as the alkaline etch solution is used to dissolve copper there is a buildup of cuprous ion which must be oxidized back to the cupric state as well as an attendant loss of chemicals due to the continuous removal of a portion of the etch solution from the system. The replenisher solution is employed to control the pH of the system; to make up the complexing agents for the copper and to dilute copper concentration to desired levels. Accordingly, the replenisher solution contains ammonium hydroxide for pH control and ammonium salts and/or chelating agents to complex with copper.

Among the useful ammonium salts which may be employed there may be mentioned ammonium carbonate, ammonium sulfate, ammonium chloride, ammonium acetate, ammonium fluoride, ammonium phosphate and the like, as well as mixtures thereof. The preferred ammonium based replenishing solution is one containing ammonium hydroxide and ammonium chloride and phosphates or ammonium hydroxide and a mixture of ammonium salts and phosphates with the presence of the phosphates being beneficial to protecting lead-tin solder surfaces.

For the specific alkaline etch solution described above, the preferred replenishment solution has the specific gravity above about 1.0 and is added in amounts to maintain the etch solution at a pH above about 7.5, preferably between about 7.5 and about 10.5.

While the copper content of the alkaline etch solutions of this invention may be varied widely, the preferred solutions contain on the average from about 50 to about 200 or more grams of copper per liter, preferably, from about 100 grams or less to about 200 grams or more per liter.

With reference now to FIG. 1, the preferred solutions will have a specific gravity of from 1.07 to about 1.27 with the preferred solutions having a specific gravity between about 1.14 to about 1.27.

Figure 2:
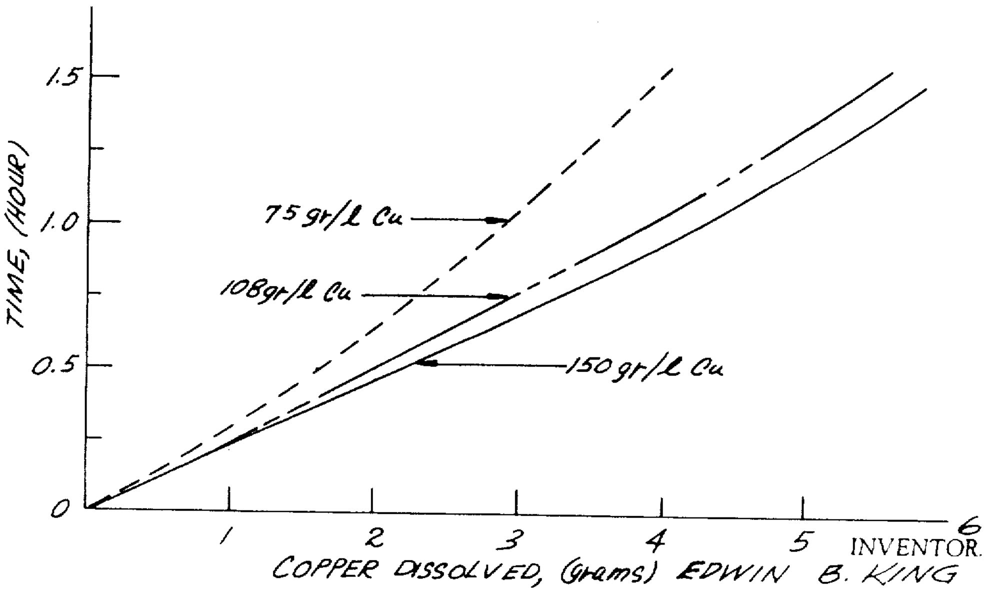
FIG. 2 is a graph of the amount of copper which may be etched per unit of time for a solution of varying ionic copper concentration.

FIG. 2 illustrates the rate of etch as a function of copper concentration of an alkaline etch solution containing 75, 108.5 and 150 grams per liter. The test sample was a 10 gram copper sheet and etch solution temperature was 130° F.

As indicated by the graph, rate of etch increases with copper concentration. Etch rate, however, for a solution containing about 108.5 grams of copper per liter is not materially different from the rate of etch for an etch solution containing higher copper concentrations and this provides a lower practical limit for achieving high etch rates.

Solutions maintained at the preferred copper concentration of from about 100 to about 200 grams per gallon and at a pH from about 7.5 to about 10.5 will provide an etch range equivalent in ability to dissolve about a gram of copper from a laminate having a copper sheet of 1.4 mils thickness within a minute which is an etch rate most acceptable to the industry.

Etch rate is, of course, somewhat temperature dependent, with etch rate increasing with temperature. The general range of operating temperatures for the above alkaline etch solution is from about 75° F. to about 150° F., preferably from about 125° F. to about 135° F., with the temperatures selected being generally dependent upon equipment variations and solution evaporation rates.

Figure 3:
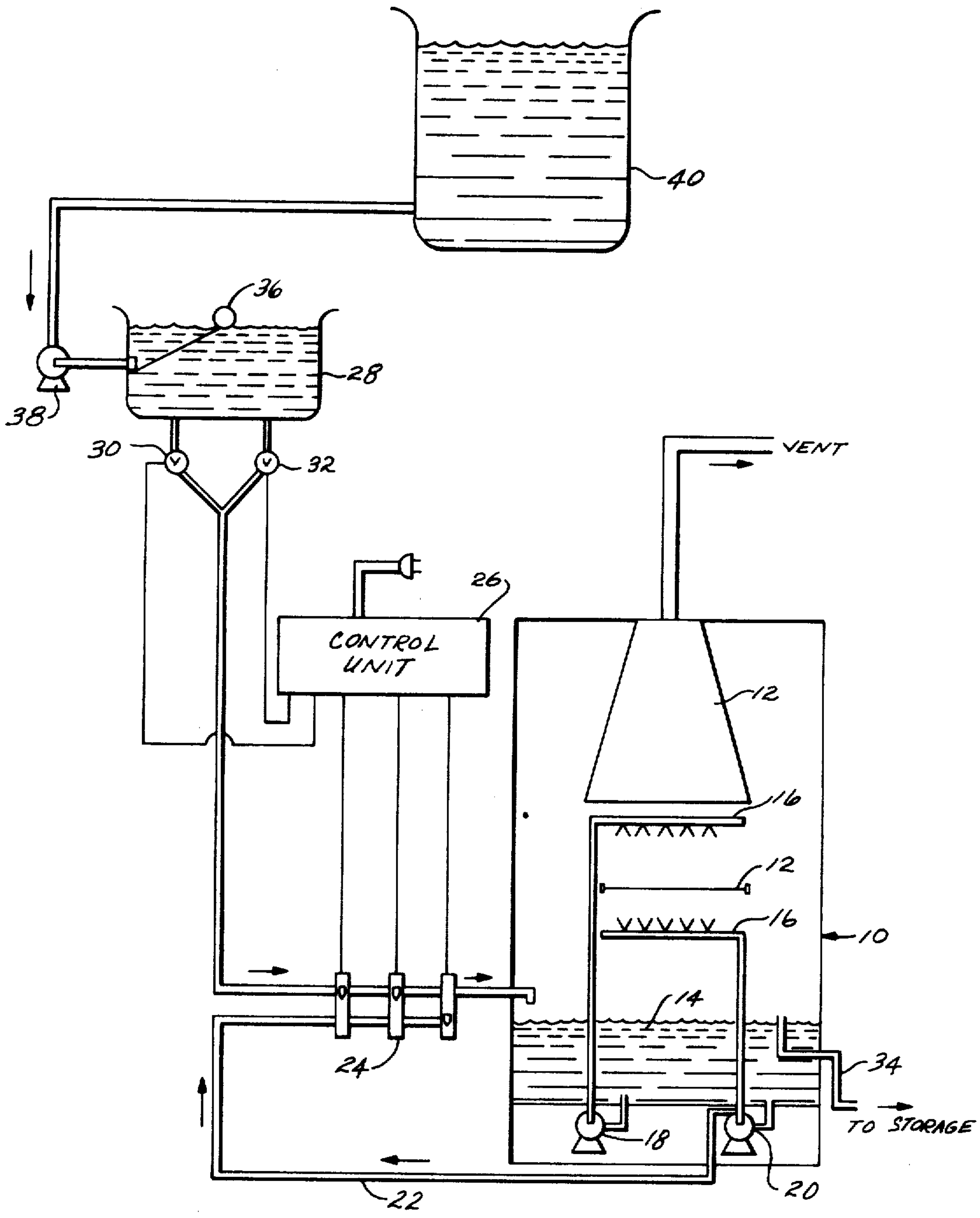
FIG. 3 is an illustration of the operation of the preferred alkaline etched regenerative system.

With reference now to FIG. 3, there is shown a preferred etch system for etching copper from a substrate continuously at uniform rates, through continuous control of copper concentration in the alkaline etch solution.

With reference thereto, etcher 10 which is of conventional construction, contains conveyor 12, which advances the substrates to be etched through the system and sump 14 containing etch solution. There is provided one or more headers 16 through which the alkaline etch solution is continuously circulated by pumps 18 and 20 and which spray etch solution onto the surface of the copper bearing substrate to be etched.

Since ammonia and other gases are evolved during the process, etcher 10 may be provided with lip vents 12 at the inlet and outlet end (not shown) which vent the gases generated, preferably, to some pollution control system. Depending on the size of the etcher and rate of flow of alkaline etch solution, additional vents may be provided to make additional oxygen available to the system.

The output feed to either pump 18 or 20 is tapped and a bleed passed by line 22 to a sensory system 24, one form of which is shown in greater detail in FIG. 4, hereinafter described.

In the sensor system there is produced some response signal which is some function of solution density or specific gravity. This signal is sent to control unit 26 which, in response, activates, adjusts or terminates a flow of neutral or alkaline ammonia based replenisher solution contained in reservoir 28 to etcher 10. In the scheme illustrated the control unit opens one or both of solenoid valves 30 and 32 to provide intermittent flow to etcher 10.

To control the volume of solution dispensed from reservoir 28, the reservoir is maintained with a constant head as provided by float valve 36 which also permits additional replenisher solution to be pumped by pump 38 from storage into reservoir 28 until valve action interrupts flow.

Addition of the replenisher raises solution level in sump 14. This causes an overflow of etch solution into line 34 to waste or storage.

Replenisher solution in being fed to etcher 10 is combined with the etch solution passing from sensor 24. Although the region where the replenisher solution is introduced to etcher 10 is rich with replenisher solution, the system rapidly comes to a dynamic equilibrium due to agitation, migration or circulation of the etch solution through the headers. As a consequence, the alkaline etch solution dispensed from headers 16 will be essentially of constant composition.

An oxidant, such as gaseous oxygen is, of course, required to convert the formed cuprous ions to a cupric state. Air is a convenient source of oxygen and may be drawn into the system by the venting system or ports in the etcher provided for this specific purpose. The etch solution as it is sprayed over the substrate absorbs oxygen from the air which oxidizes the cuprous ions in the solution to the cupric state.

If the aspirated air is insufficient to provide a desired rate of oxidation, a supplemental oxidizer may be forced into the system, for instance, by bubbling the air or oxygen through the solution contained in sump 14.

Figure 4:
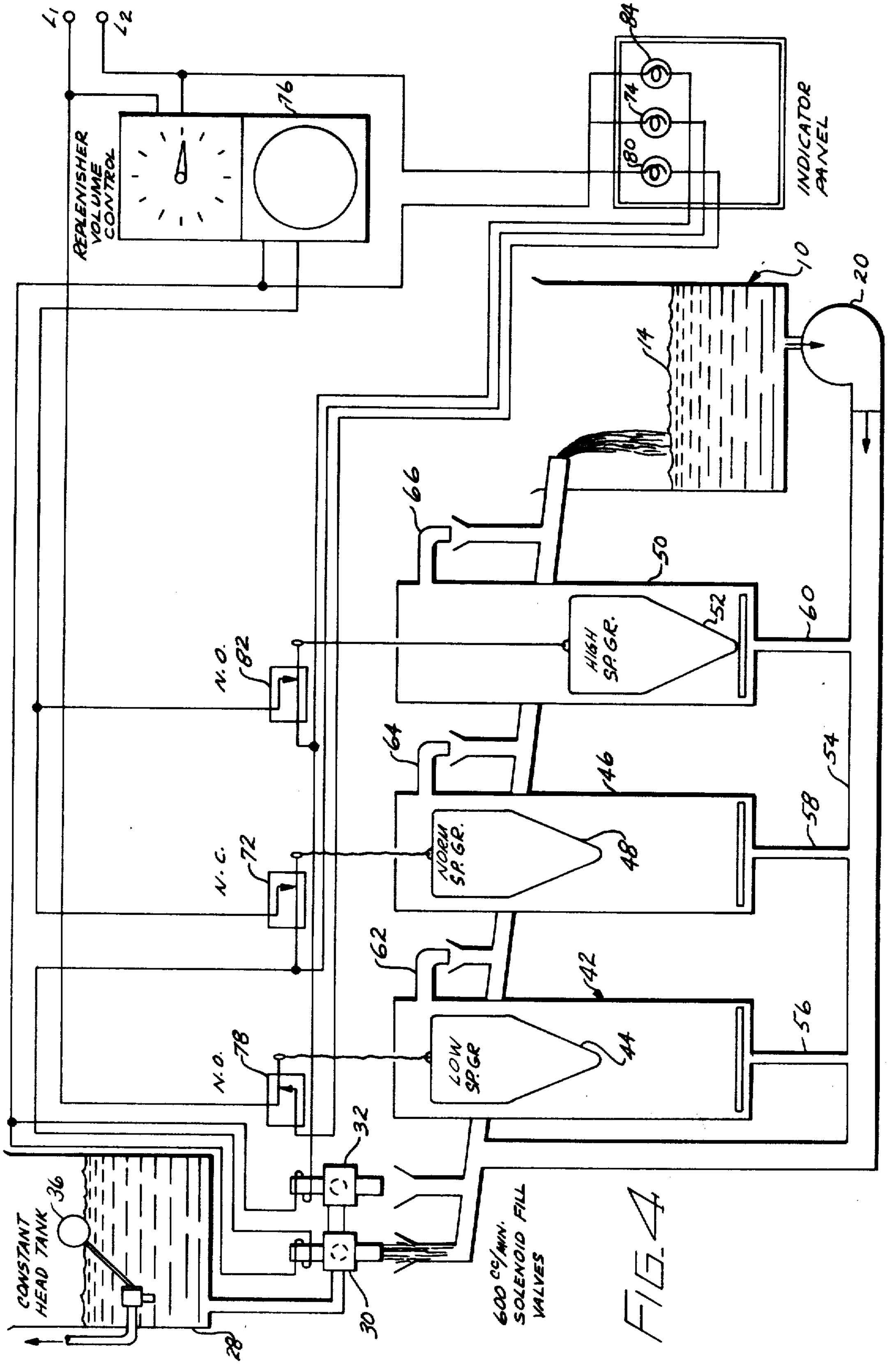
FIG. 4 is a detailed illustration of one system for controlling the amount of replenisher introduced to reconstitute the etch solution.

With reference now to FIG. 4, there is shown in greater detail one system for controlling the amount of replenisher fed to the sump of the etcher 10. Etcher 10 contains sump 14 and a pump, which may be pump 20 of FIG. 1, taped to permit the bleed of a quantity of etch solution from sump 14 to sensory system 24. The sensory system shown contains three hydrometers each having a float sensitive to solution differing specific gravity.

For a typical etch solution of this invention, hydrometer tube 42 contains float 44 responsive to a solution having a specific gravity of about 1.140, hydrometer tube 46 contains float 48 which is responsive to a solution having a specific gravity of 1.15 and hydrometer tube 50 contains float 52 responsive to a solution having a specific gravity of 1.160.

A portion of the etch solution in sump 14 passes through line 54 through risers 56, 58 and 60 and in contact with floats 44, 48 and 52 contained in hydrometers 42, 46 and 50 then through overflow ports 62, 64 and 66 to return line 70 which is also employed to carry replenisher solution contained in reservoir 28 to the sump 14 of etcher 10. Weights may be added as desired to the switch levers to calibrate the hydrometers or adjust gravometric parameters.

While the control system shown may be used to maintain the etch solution at any desired specific gravity, it will be described in terms of maintaining the alkaline etch solution at a specific gravity of about 1.15. When this selected specific gravity is reached or exceeded, microswitch 72 is closed. This activates a "normal" pilot light 74 and actuates volume control 76 which, in turn, opens solenoid valve 30 for a specified period of time.

A predetermined quantity of replenisher fluid is then dispensed from reservoir 28 through valve 30 and delivered by line 70 to sump 14. As the etcher continues to operate during this period of time it is evident that the specific gravity in the sump be in excess of 1.15 by the time the replenisher solution is delivered to the sump. Thus, the net effect is a dilution of the etch solution contained in the sump to a specific gravity of 1.15 by a cyclic operation.

The volume of replenisher fluid delivered is time controlled with the time set to be consonant with the rate at which copper is etched from the substrate. If the timer setting is too long such that the amount of replenisher solution delivered exceeds the requirements of the system, the copper content may be diluted to a level where the solution reaches a specific gravity below 1.14. When this occurs, float 44 will sink, closing microswitch 78 which activates pilot light 80. This indicates to the operator to reset the timer of control 76 for a shorter period of time to reduce the volume of replenisher delivered in each cycle.

In the event the amount of replenisher dispensed is insufficient to keep up with the rate at which copper is etched, the specific gravity of the solution will increase with time. When the solution reaches a specific gravity of 1.16, float 52 will rise and close microswitch 82. This will activate pilot light 84 and open solenoid 32 to dispense an additional quantity of replenisher fluid. This acts as a fail-safe device and gives to the operator an indication that the timer may be adjusted so as to dispense a greater quantity of replenisher solution each time microswitch 72 is activated. It will be appreciated this system is set to maintain the etch solution within a specific gravity of 0.01 of a preselected norm.

While the control system described functions as a modulator, it is evident a wide variety of control systems could be used to maintain the etch solution at a desired state. For instance, the hydrometer system shown could be replaced by a conductivity cell, by "bubbler" tubes having standard pneumatic control systems, or a similar means for determining the copper content of the bleed alkaline etch solution.

The signal, or signals from the cell may be employed, for instance, to control the rate of pumping of a variable speed pump to continuously feed the replenisher solution to the sump at a rate consonant with the requirements of the etcher.

Such a pump may be controlled, for instance, by a silicon controlled rectifier (SCR) whose output is, in turn, modulated by a control system which is responsive to the copper content of the etcher solution.

Figure 5:
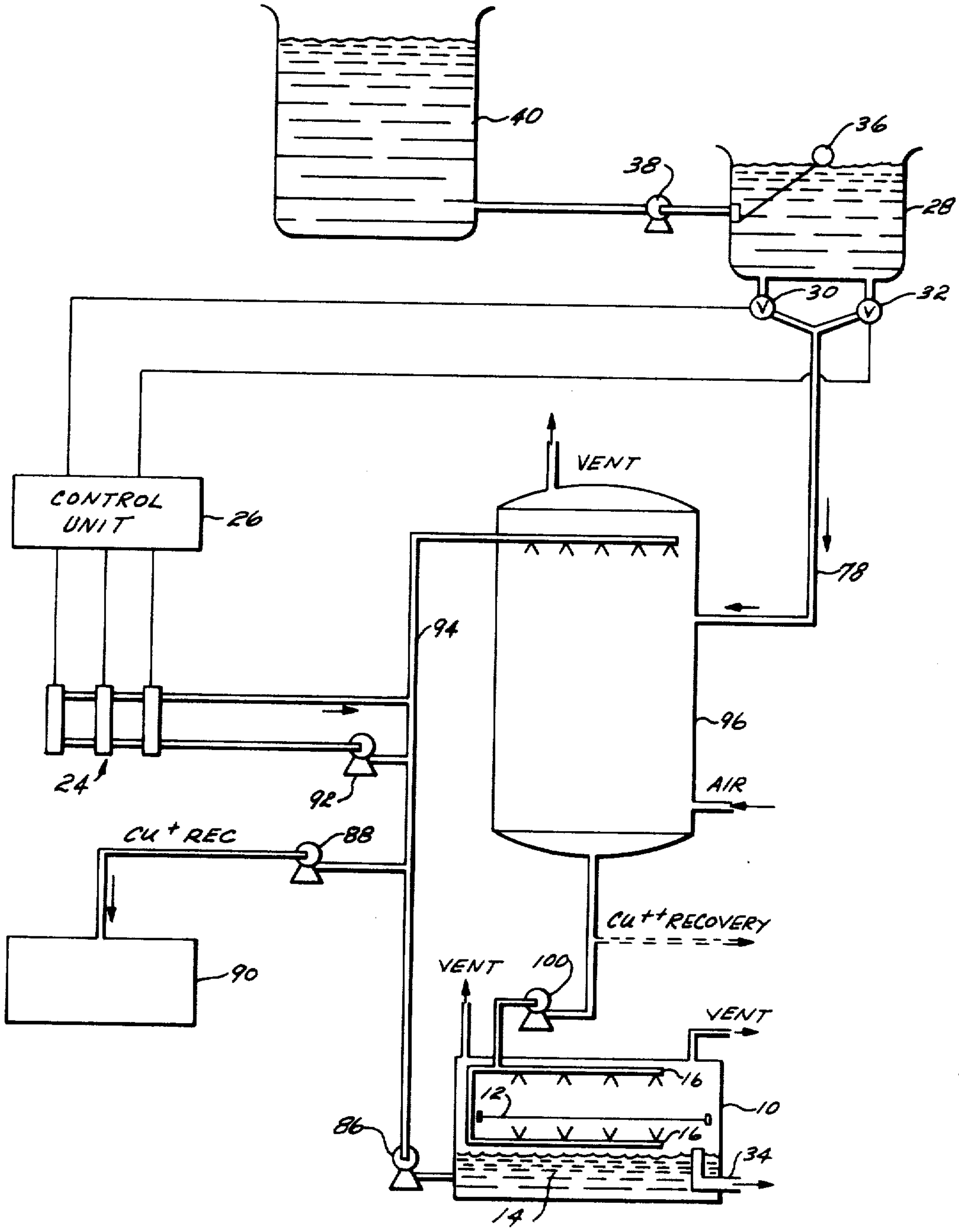
FIG. 5 is an illustration of the scheme employed in regenerating the etch solution external to the etcher.

With reference now to FIG. 5, there is shown a system wherein the alkaline etch solution is reconstituted external to sump 14 of etcher 10.

In the system illustrated, pump 86 withdraws a portion of the etched solution from sump 14 at a rate about equal to the feed rate to headers 16 plus the amount of copper solution to be removed from the system. The amount of solution to be removed may be pumped by pump 88 to storage 90 or to waste.

A portion of the remainder is fed by pump 92 in a closed loop through sensor 24 and back to line 94 to reconditioning column 96. The signal generated in sensor 24 is fed to control unit 26 which, as indicated, actuates solenoid valves 30 and/or 32 to permit a controlled amount of replenisher solution to be dispensed from reservoir 28. The replenisher solution passes by line 98 into column 96, which may be a packed column, where it is admixed with the spent etch solution. Air, or another source of an oxidant is introduced at the base and flows countercurrent to the flow of etch solution and replenisher. This provides the oxidizer for cuprous ions. The solution in column 96 is then fed at the desired rate by pump 100 to headers 16 for contact with the substrate traveling on conveyor 12 through etcher 10.

Where it is desired to recover the copper in the solution removed from the system in the cupric state, pump 88 which feeds reservoir 90 may be connected to the output of column 96. All of the spent solution is conditioned to convert cuprous ions to the cupric state. A portion is then removed by pump 88 and the balance returned to etcher 10.

Although it is shown in FIG. 5 that the reconstituted etch solution is fed directly to headers 16, it may, in the alternative, be fed to sump 14 of etcher 10.

While the system described above is capable of providing uniform etch rates, etch rates may, of course, be controlled by the nature of the material being etched. Although etch rate will be uniform for a substrate having a surface which is uniform with respect to copper content such as a circuit board, other materials, such as alloys and the like, may vary with respect to the amount of copper exposed. Under such conditions, etch rate will be dependent upon the amount of copper exposed.

In the operation of the regenerative etch system of this invention, the initial charge to the etcher may be accomplished with a sodium chlorite oxidizer to oxidize sufficient copper to maintain the desired etch rate, after which the addition of fresh $NaClO_2$ is unnecessary, or by adding cupric chloride or other cupric salt crystals to the start-up solution.

When start-up is initiated, solution requirements are met by the ammonia based replenisher solution. As a portion of the etch solution is continuously removed, any extraneous ions initially introduced for start-up purposes will eventually be removed with it. When this occurs, the solution removed will be essentially free of extraneous ions and of high economic value.

In the practice of the process of this invention, there is no need for neutralization, sedimentation or filtration. The continuous supply of replenisher automatically corrects pH and copper concentrations without the addition of chemical additives.

The bleed off solution from the process which contains copper may be discharded, electrolytically treated to remove copper with recycle of the copper depleted solution, or utilized as a high purity raw material supply in the manufacture of commercial copper chemicals.

What is claimed is:

1. A continuous process for dissolving copper from substrates comprising:

(a) continuously oxidizing copper from copper bearing substrates with cupric ions to obtain cuprous ions, the cupric ions being in a regenerative alkaline etching solution containing a predetermined concentration range of ionic copper, ammonium hydroxide, and at least one copper complexing agent selected from the group consisting of at least one ammonium complexing salt for the copper and at least one chelating agent for the copper, wherein the ammonium complexing salt is always present, the alkaline etching solution having a pH of from between about 7.5 to about 10.5;

(b) continuously oxidizing the cuprous ions to cupric ions with oxygen;

(c) sensing the ionic copper concentration to generate a signal when the concentration of ionic copper reaches a predetermined maximum;

(d) removing a quantity of the alkaline etching solution including ionic copper from the etching solution in response to the signal to lower, within the range, the ionic copper concentration of the etching solution; and (e) adding to the etching solution an ammonia based replenisher solution selected from the group consisting of neutral and alkaline solutions selected from the group consisting of the ammonium salt, ammonium hydroxide, and the chelating agent wherein the ammonium salt is always added, the addition being in an amount sufficient to replace the ammonium salt, ammonium hydroxide and the chelating agent removed during the removal step.

2. The continuous process for dissolving copper claimed in claim 1 wherein the minimum concentration of ionic copper in the predetermined concentration range is about 100 grams per liter.

3. The continuous process for dissolving copper claimed in claim 2 wherein the maximum concentration of ionic copper in the predetermined concentration range is about 200 grams per liter.

4. The continuous process for dissolving copper claimed in claim 1 wherein:

the step of oxidizing copper from copper bearing substrates includes spraying such substrates with the alkaline etchant solution in the presence of ambient air; and the step of oxidizing the cuprous ions to cupric ions is substantially completely effected through oxygen in the ambient air during the spraying.

5. The continuous process for dissolving copper claimed in claim 4 wherein the minimum concentration of ionic copper in the predetermined concentration range is about 100 grams per liter.

6. The process for dissolving copper from substrates claimed in claim 4 wherein the sensing step includes sensing the specific gravity of the solution to generate the signal at a predetermined specific gravity.

7. The process for dissolving copper from substances claimed in claim 4 wherein the ammonium salt in the etching solution and the replenisher solution is selected from at least one of the ammonium salts consisting of ammonium carbonate, ammonium sulfate, ammonium chloride, ammonium acetate, ammonium fluoride, and ammonium phosphate.

8. The process for dissolving copper from substrates claimed in claim 7 wherein the ammonium salts for both the etching solution and the replenisher solution is ammonium chloride.

References Cited

UNITED STATES PATENTS

| | | | |
|---|---|---|---|
| 2,927,871 | 4/1960 | Mancke et al. | 134—10 |
| 3,466,208 | 9/1969 | Slominski | 156—18 |
| 3,526,560 | 9/1970 | Thomas | 156—345 |
| 3,557,000 | 1/1971 | Smith | 252—79.5 |
| 3,607,549 | 9/1971 | Bielefeld et al. | 156—345 |

JACOB H. STEINBERG, Primary Examiner

U.S. Cl. X.R.

156—345; 252—79.5; 134—10